F. P. MURPHEY.
DIFFERENTIAL DROPPER MECHANISM FOR CORN PLANTERS.
APPLICATION FILED JAN. 11, 1909.
936,471.
Patented Oct. 12, 1909.
3 SHEETS—SHEET 2.
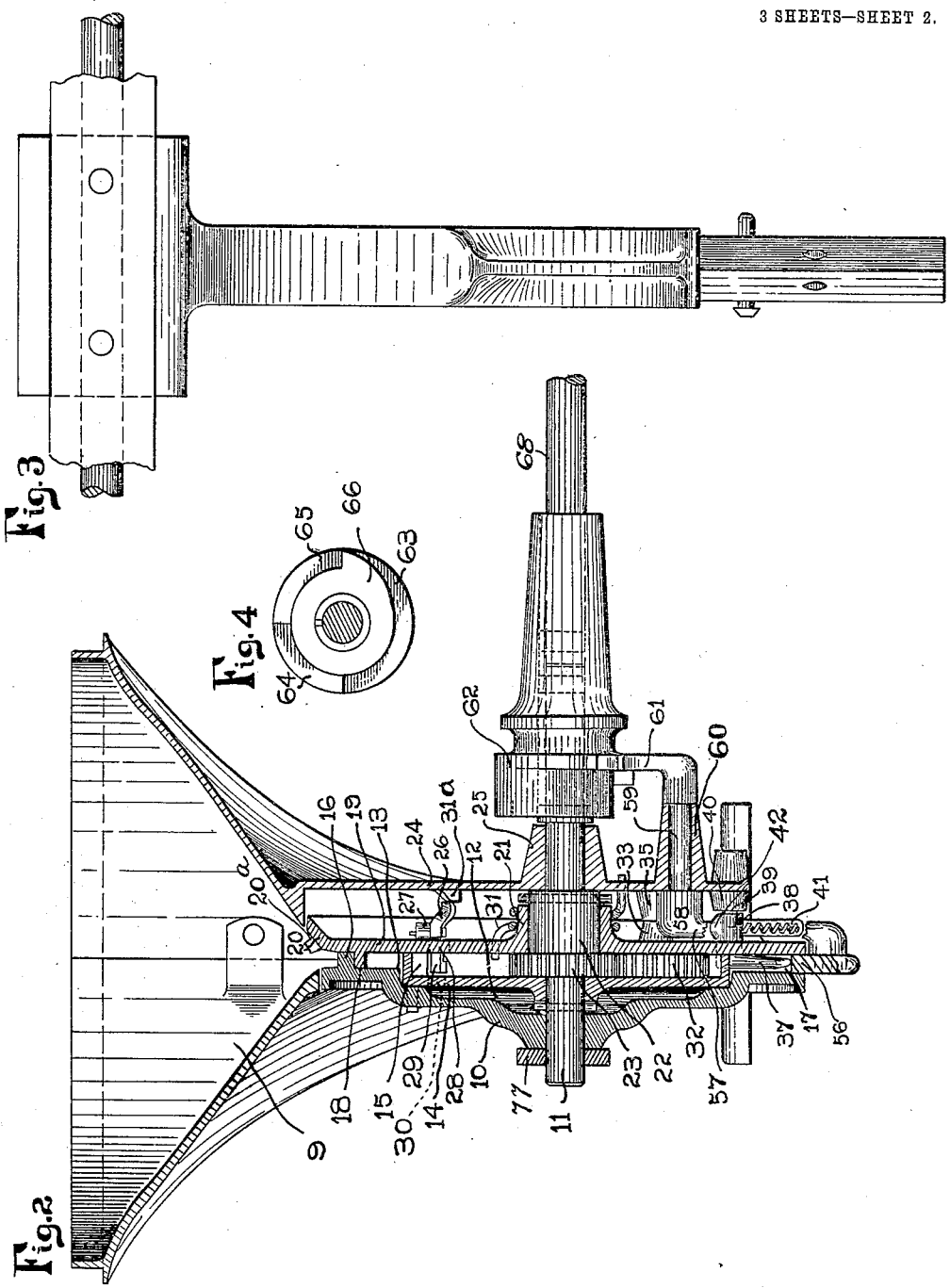

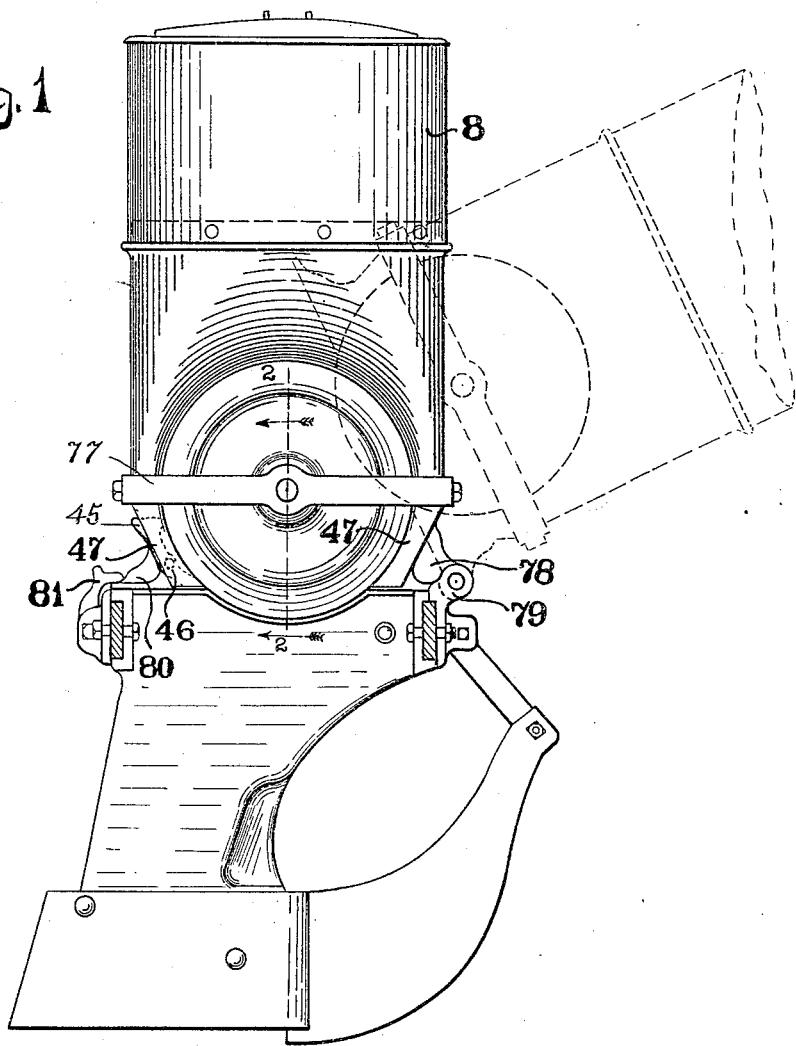
F. P. MURPHEY.
DIFFERENTIAL DROPPER MECHANISM FOR CORN PLANTERS.
APPLICATION FILED JAN. 11, 1909.
936,471.
Patented Oct. 12, 1909.
3 SHEETS—SHEET 1.

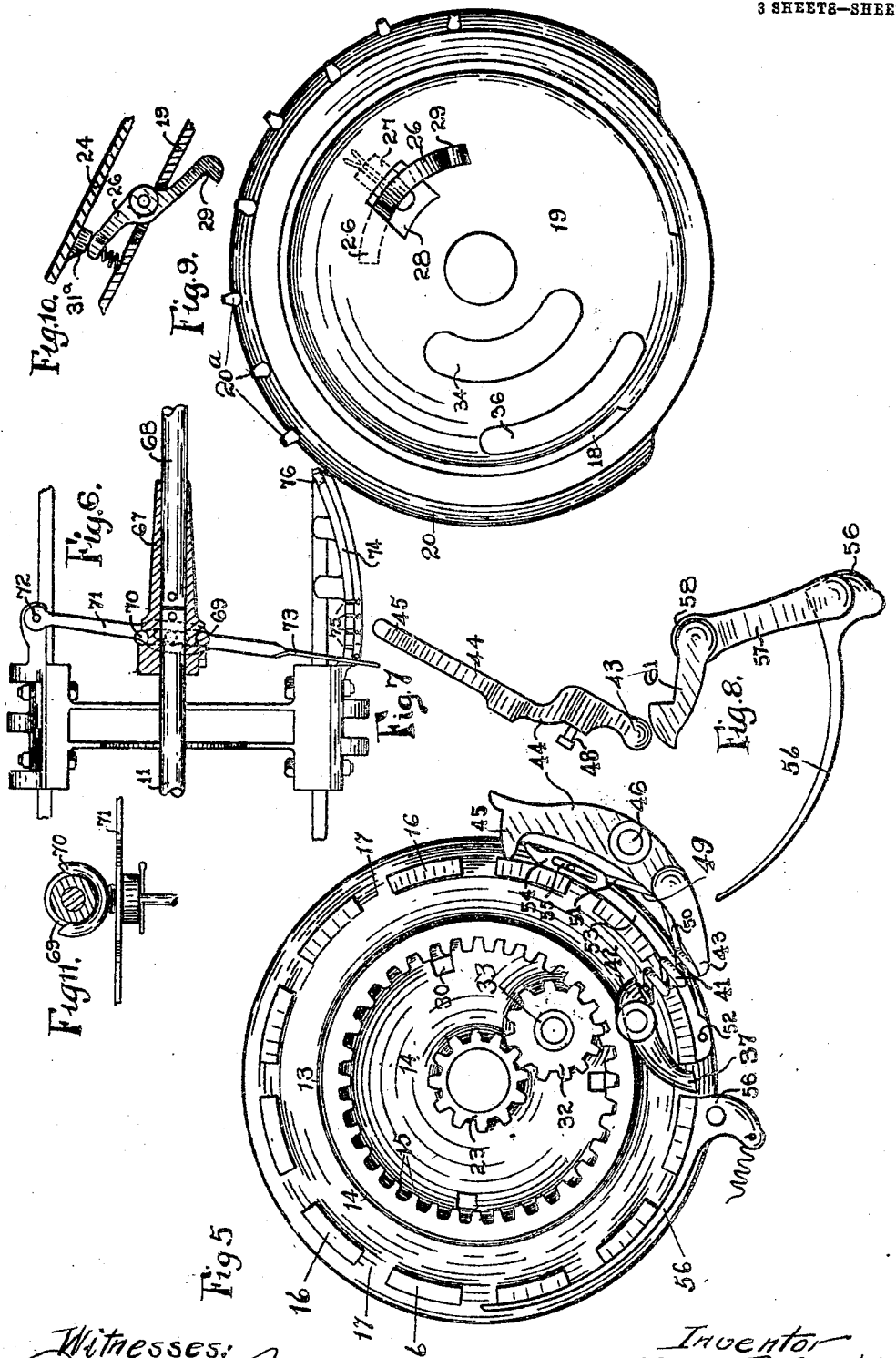

UNITED STATES PATENT OFFICE.

FRANK P. MURPHEY, OF DECATUR, ILLINOIS.

DIFFERENTIAL DROPPER MECHANISM FOR CORN-PLANTERS.

936,471.  Specification of Letters Patent.  Patented Oct. 12, 1909.

Application filed January 11, 1909. Serial No. 471,824.

*To all whom it may concern:*

Be it known that I, FRANK P. MURPHEY, a citizen of the United States, residing at Decatur, in the county of Macon and State of Illinois, have invented certain new and useful Improvements in Differential Dropper Mechanism for Corn-Planters, of which the following is a specification.

The object of this invention is to afford means, within the control of the operator, for measuring out and dropping a predetermined number of kernels of corn or other grain with each actuation of the mechanism by a check row wire not shown, and the invention relates particularly to the construction and arrangement of the pocketed feed wheel, the agitator associated therewith, the cut-off slide, and the adjustable cam head for controlling its regulation. In certain prior constructions the pocketed feed wheel has been mounted to revolve on a vertical axis, which brings the feed wheel into a horizontal plane immediately above the discharge spout. The above arrangement is objectionable for the reason that it is wasteful of space and incapable of being located close up to the drive wheels of the planter. In the present invention the feed wheel is mounted to revolve on a horizontal axis, which brings the wheel itself into a vertical plane immediately above and in alinement with the discharge chute and furrow opener, which results in a very compact arrangement and one which enables the dropper mechanism to be located very close to the drive wheels, where such an arrangement is desirable.

A further object of the invention is to so construct and actuate the agitator that it will fit closely into and co-act with the feed wheel, and will serve, in conjunction therewith, to work down the kernels of grain edgewise into the cells or pockets of the wheel and in position for final discharge.

Further objects will appear from a detailed description of the invention, which consists in the features of construction and combination of parts hereinafter described and claimed.

In the drawings, Figure 1 is a side elevation of the grain hopper, the feed wheel, the discharge boot, and the shoe or furrow opener; Fig. 2 a cross sectional view through the feed mechanism, taken on line 2—2 of Fig. 1, looking in the direction of the arrow; Fig. 3 a front elevation of the boot or furrow opener; Fig. 4 an end view of the variable cam head; Fig. 5 a face view of the feed wheel and associated parts; Fig. 6 a detail showing the cam shifting lever and cam head; Fig. 7 a detail of the spring controlled cut-off finger; Fig. 8 a detail of the slide valve; Fig. 9 an inner face view of the agitator; Fig. 10 a detail of the trigger; and Fig. 11 a detail of the cam operating lever.

The corn is contained within a cylindrical chamber 8 which rests upon and is carried by a chute 9. The chute is cut away on one side to provide for the mounting of a pocketed feed wheel 10 which is mounted upon a horizontal stub shaft 11. The feed wheel is dished on its inner face 12 and shouldered at the point 13 near its periphery to receive a gear plate 14 having inner gear teeth 15 around its periphery. The inner face of the feed wheel, near its rim, is provided at uniform intervals with lugs 16 which are located to provide spaces 17, and the lugs closely surround a circular flange 18 formed on the inner face of a circular agitator disk 19, the rim 20 of which is extended beyond the lugs 16 and flared back, as shown in Fig. 2, and provided with a series of studs $20^a$. The lugs on the feed wheel, in combination with the flared rim and circular flange on the agitator disk serve to provide pockets or cells at recurrent intervals around the periphery of the feed wheel, so that kernels of grain admitted into the spaces between the lugs will be fed down by the revolution of the feed wheel. The agitator disk is provided at its center with a flanged hub 21 which is journaled upon the hub 22 of a driving gear wheel 23, which is pinned to the stub shaft 11. The agitator disk is inclosed by the side wall 24 of the hopper 9 which, at this point, is flat and offset to provide space for the location of the parts. The shaft 11 is entered through a boss 25 formed on the outside of the side wall, which boss serves as a journal mounting for the shaft.

The agitator disk is intended to oscillate back and forth coincident with the revolution of the feed wheel, and in order to accomplish this movement the agitator disk has mounted thereon a trigger 26, which is pivoted to a lug 27 on the face of the disk adjacent to an opening 28. One end 29 of the trigger is adapted to swing into and engage with a recess 30 in the face of the gear plate 14, and serves to lock the agitator disk onto the gear plate, so that the former will be given a partial revolution with the latter under the tension of a spiral spring 31, which is wound around the hub of the agitator disk and is adapted to be wound up and put under tension as the agitator disk is revolved. In order to trip the trigger and disengage the agitator disk from the gear plate, a cam lug 31ª is formed on the inner face of the wall 24 and positioned to lie within the line of travel of the outer end of the trigger, so that when the trigger is brought to the proper point it will ride up on the cam face of the lug, thereby releasing the opposite end of the trigger from engagement with the gear plate and allow the agitator disk to fly back under spring tension.

The gear wheel 23 meshes with an intermediate gear wheel 32, the hub 33 of which extends through a slot 34 in the agitator disk and is journaled to a boss 35 formed on the inner face of the wall 24. The length of the slot 34 affords a clearance for permitting the rocking movement of the agitator disk. Concentric with the slot 34 is an outer slot 36 of greater length than the slot 34, through which projects the inner end of a knocker or ejector 37, the outer end of which merges into a sleeve 38 journaled upon a pin 39 carried by a boss 40. The free or acting end of the knocker is held under tension by the action of a spring 41 which bears against a lug 42 outwardly projecting from the sleeve 38, which arrangement serves to hold the acting end of the knocker in engagement with the inner faces of the pocket lugs 16 on the feed wheel, so that the kernels of corn or other grain lodged therein will be driven out when brought to the point of discharge. In order to permit of this action of the knocker, the flange 18 on the inner face of the agitator disk is broken away at the lower side thereof, as shown in Fig. 9, so as to permit the knocker to engage the pockets or cells from within. The opposite end of the spring 41 bears against the lower end 43 of a cut-off finger 44, the upper end 45 of which is hooked and is entered into the channel intermediate the rim of the feed wheel and the agitator disk, and rides upon the outer faces of the pocket lugs, so as to prevent the clogging of grain, and at the same time to permit the loaded pockets to move thereunder without difficulty.

The cut-off finger is pivoted near its center by a pin 46 entered through a slotted plate 47 which is concaved on its inner edge and serves to close the space between the periphery of the feed wheel and the agitator plate, and provides an inclosed passage for the down-feed of the grain. The cut-off finger is offset below its pivotal point and is provided with a pin or stud 48 around which is coiled the loop of a spring 49 having oppositely projecting ends 50 and 51. The end 50 is entered through a perforated tongue 52 at the lower end of a curved guard plate 53 which bears against the pocket lugs and serves to firmly hold the kernels of grain in place within the pockets. The upper end 54 of the guard plate is turned back slightly to prevent wedging of the grain, and the plate, near its upper end, is provided with a slotted tongue 55 which receives the upper end 51 of the spring. The arrangement is one which holds the kernels of grain under spring tension immediately prior to their final discharge, which is effected either by gravity or by the positive action of the knocker. The guard plate terminates at the lowermost point in the line of travel of the grain, permitting uninterrupted discharge of the grain save when cut off by the action of a curved slide valve 56, which occupies a space corresponding to that of the guard plate on the other side of the feed wheel. When the slide valve is brought to its lowermost position its inner end will engage with the lower end of the guard plate and the discharge of grain will be prevented, the loaded pockets being carried past the discharge point, and back to the hopper. When the slide valve is moved back it will provide an opening immediately below the free end of the knocker for the discharge of the kernels of grain from the pockets. The slide valve is rigidly secured to the lower end of an arm 57 which, in Fig. 2 is shown partially broken away, which arm terminates in a head 58 which receives a stub rock shaft 59 which is journaled within a sleeve 60 outwardly projecting from the face of the wall 24. The outer end of the stub shaft is entered into the end of a bent rocking arm 61 which engages a cam head 62.

The cam head is designed to actuate the rocking arm 61, which bears against it in such a manner as to discharge the intended number of kernels with each actuation of the mechanism. For this purpose the cam head, in the form shown, is provided with four adjacent cam sections 63, 64, 65, and 66, respectively. The innermost section 63 is in the form of a complete ring, upon which the rocking arm rides without movement, and when the cam head is thrown to its innermost position, to bring the section 63 into engagement with the rocking arm, the latter will be held back in a position which holds the curved slide valve closed to prevent the discharge of grain. The section 64 is formed to provide an elevated surface around about half of the periphery of the cam head, and with this adjustment the slide valve will be actuated during about a half revolution of the cam head, which provides for the discharge of a single kernel of grain. The section 65, which is the next section of the cam head, affords an elevated surface extending about one-quarter of the distance around the periphery of the cam head; and when the head is moved to bring the rocking arm in engagement with this section the valve will be held open during about three-quarters of its revolution, which permits the passage and discharge of two kernels of grain with each revolution of the cam head. The section 66 provides an elevation of very limited extent, and with the cam head adjusted to bring the rocking arm into engagement with the section of the head the valve will be held open during the passage and discharge of three kernels of grain.

Referring to Fig. 6, the cam head terminates in an elongated shank 67, and the cam head and shank are slidably mounted upon the outer end of the stub shaft 11, and the inner end of a main shaft 68, which constitutes, in effect, a prolongation of the stub shaft. The cam head is provided with a circumferential groove 69 which receives a half ring 70 swiveled to a split lever 71, which is pivoted at one end 72, and at the other end is provided with a handle 73 adapted to move in register with a notched rack bar 74 provided with suitable numbers 75 for indicating the number of kernels to be discharged when the lever is thrown to engage a selected notch in the rack bar. In addition to the numbered notches, the rack bar is provided with a terminal notch 76 which is adapted to receive the lever handle when the latter is thrown to a position to slide back the cam head and shank entirely onto the main shaft 68 and in position to disengage the stub shaft. As shown, the rack bar is provided with notches numbered 0, 1, 2, 3, and 4, the latter of which notches indicates the position in which the rocking arm will be entirely out of engagement with the cam head, so that the discharge of grain will be continuous. The sliding back of the cam head out of engagement with the stub shaft permits the mechanism to be tilted back in the position shown in dotted lines in Fig. 1. The outer end of the stub shaft is journaled through a side bar 77 connected with the wall of the hopper 9, which latter is provided with a tongue 78, which is pivoted to an eye 79 carried by the frame of the machine. This tongue 78 is supplemented by a locking tongue 80 adapted to be engaged by a latch finger 81 or other suitable locking means.

In use, the grain contained within the cylindrical receptacle will be fed down between the converging walls of the hopper and into the pockets afforded within the narrow slot or channel intermediate the rims of the feed wheel and the agitator disk. Each pocket is of a size to receive a single kernel of grain in edgewise position. When the mechanism is actuated by a knot in a check row wire not shown, the main shaft and stub shaft will be given a complete revolution. A complete revolution of the stub shaft will impart a partial revolution to the feed wheel, sufficient to carry four cells or pockets past the discharge point. By adjusting the cam head to the selected position, all four of the pockets, or any number less than four, can be discharged, depending upon the period of time during which the slide valve will be moved to open the discharge. Simultaneously with the forward movement of the feed wheel, the agitator disk will be initially carried forward under spring tension and thereafter released by the tripping of the trigger and allowed to fly back to initial position, which movement, in opposition to the travel of the feed wheel, will serve to thoroughly shake down the kernels of grain into the pockets provided therefor. The agitating movement will be all the more effective by reason of the fact that the rim and the underlying flange of the agitator plate itself form one side and the bottom of each of the cells or pockets, so that the grain will be perfectly deposited in position, one kernel on edge in each cell, so that it will be impossible for two kernels to be jammed or forced endwise into a single pocket. As the feed wheel revolves, the kernels of grain will be brought under the spring actuated stop finger, the bent or hooked end of which will force each kernel of grain into position and at the same time cut off the supply of loose grain from above. A continued movement of the feed wheel carries the grain under the spring backed guard plate and down to the point of discharge. The cam arrangement is one which permits the operator to readily control the discharge of the grain from a suitable and convenient point and, if desired, to bodily lift the mechanism as a whole away from the boot without difficulty. The arrangement is extremely compact, by reason of the fact that the principal portions of the mechanism,—the feed wheel and the agitator disk— are arranged in parallelism with the boot and furrow opener and occupies but a very limited space in the corn planter.

What I claim as new and desire to secure by Letters Patent is:

1. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, and means for imparting to the agitator disk movements in a direction reverse to the travel of the feed wheel, substantially as described.

2. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, and means for imparting an oscillating movement to the agitator disk, substantially as described.

3. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting to the agitator disk movements in a direction reverse to the travel of the feed wheel, a member adjacent to the cells or pockets and adapted to hold the grain in the pockets prior to its discharge, and a movable slide valve coöperating with said member and adapted to regulate the discharge of grain, substantially as described.

4. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting an oscillating movement to the agitator disk, a member adjacent to the cells or pockets and adapted to hold the grain in the pockets prior to its discharge, and a movable slide valve coöperating with said member and adapted to regulate the discharge of grain, substantially as described.

5. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting to the agitator disk movements in a direction reverse to the travel of the feed wheel, a member adjacent to the cells or pockets and adapted to hold the grain in the pockets prior to its discharge, a movable slide valve, and cam mechanism for regulating the movements of the slide valve to vary the frequency of the discharge of grain from the pockets, substantially as described.

6. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting an oscillating movement to the agitator disk, a member adjacent to the cells or pockets and adapted to hold the grain in the pockets prior to its discharge, a movable slide valve coöperating with said member and adapted to regulate the discharge of grain, and cam mechanism for regulating the movements of the slide valve to vary the frequency of the discharge of grain from the pockets, substantially as described.

7. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting to the agitator disk movements in a direction reverse to the travel of the feed wheel, a member adjacent to the cells or pockets and adapted to hold the grain in the pockets prior to its discharge, a movable slide valve coöperating with said member and adapted to regulate the discharge of grain, a revoluble cam head provided with a plurality of differing cam surfaces, and a member engaging the slide valve and adapted to register with a selected one of said cam surfaces for regulating the movements of the slide valve and thereby controlling the flow of grain, substantially as described.

8. In grain dropper mechanism, the combination of a feed wheel provided on its face at recurrent intervals with lugs, an agitator disk in facial contact with the lugs and provided with an underlying flange adapted, in combination with the lugs, to afford cells or pockets, means for revolving the feed wheel, means for imparting an oscillating movement to the agitator disk, a member adjacent to the cells or pockets and adapted to hold the grain in the pockets prior to its discharge, a movable slide valve coöperating with said member and adapted to regulate the discharge of grain, a revoluble cam head provided with a plurality of differing cam surfaces, and a member engaging the slide valve and adapted to register with a selected one of said cam surfaces for regulating the movements of the slide valve and thereby controlling the flow of grain, substantially as described.

9. In grain dropper mechanism, the combination of a revoluble feed wheel standing in a vertical plane and provided near its periphery with a plurality of lugs, an agitator plate mounted in a plane parallel and closely adjacent to the feed wheel and provided with a flange underlying the lugs and forming, in combination therewith, cells or pockets, a pivoted cut-off finger adapted to engage the lugs and located on the feeding side of the feed wheel, a spring for holding said finger in acting position, and a resiliently mounted guard plate located below the cut-off finger and located adjacent to the periphery of the feed wheel, and means for controlling the discharge of grain from the pockets, substantially as described.

10. In grain dropper mechanism, the combination of a revoluble feed wheel standing in a vertical plane and provided near its periphery with a plurality of lugs, an agitator plate mounted in a plane parallel and closely adjacent to the feed wheel and provided with a flange underlying the lugs and forming, in combination therewith, cells or pockets, a pivoted cut-off finger adapted to engage the lugs and located on the feeding side of the feed wheel, a spring for holding said finger in acting position, a resiliently mounted guard plate located below the cut-off finger and located adjacent to the periphery of the feed wheel, and a slide valve located adjacent to the periphery of the feed wheel on the side opposite to the guard plate and adapted to be moved away from the guard plate to afford an opening for the discharge of grain, substantially as described.

11. In grain dropper mechanism, the combination of revoluble feed wheel standing in a vertical plane and provided near its periphery with a plurality of lugs, an agitator plate mounted in a plane parallel and closely adjacent to the feed wheel and provided with a flange underlying the lugs and forming, in combination therewith, cells or pockets, a pivoted cut-off finger adapted to engage the lugs and located on the feeding side of the feed wheel, a spring for holding said finger in acting position a resiliently mounted guard plate located below the cut-off finger and located adjacent to the periphery of the feed wheel, a slide valve located adjacent to the periphery of the feed wheel on the side opposite to the guard plate and adapted to be moved away from the guard plate to afford an opening for the discharge of grain, and a knocker engaging the inner faces of the lugs and adapted to force out kernels of grain from between the lugs, substantially as described.

12. In grain dropper mechanism, the combination of a feed wheel provided at recurrent intervals with lugs, an agitator plate adjacent to the feed wheel and provided with a flange underlying the lugs and forming cells or pockets in combination therewith, said flange being cut-away at the point of discharge, and a knocker projecting through said cut-away portion of the flange and adapted to strike down into the spaces intermittent the lugs, for forcing out kernels of grain, substantially as described.

13. In grain dropper mechanism, the combination of a feed wheel adapted to feed kernels of grain, a slide valve for regulating the discharge of grain from the feed wheel, a revoluble cam head having around its circumference a plurality of differing cam surfaces, and a member connected with the slide valve and adapted to engage a selected one of said cam surfaces, substantially as described.

14. In grain dropper mechanism, the combination of a grain receptacle; a hopper located below the receptacle, and provided with converging side walls leading to a narrow elongated discharge slot, a revoluble feed wheel, and a lateral adjacent agitator, both located below and in alinement with the slot, and adapted to receive and carry down kernels of grain therefrom, substantially as described.

15. In grain dropper mechanism, the combination of a feed wheel adapted to feed kernels of grain, a slide valve for regulating the discharge of grain from the feed wheel, a revoluble cam head having around its circumference a plurality of differing cam surfaces, a member connected with the slide valve and adapted to engage a selected one of said cam surfaces, a stub shaft upon which the cam head is slidably mounted, gearing on the stub shaft for actuating the feed wheel, a main shaft in alinement with the stub shaft and adapted to permit the cam head to be moved back thereonto and away from the stub shaft, a frame carrying the feed wheel, a stub shaft and associated elements, and means for hinging said frame to permit the frame to be swung back when the cam head is disengaged from the stub shaft, substantially as described.

FRANK P. MURPHEY.

Witnesses:
W. H. STOUFFER,
J. H. HALL.